US 6,625,299 B1

(12) United States Patent
Meisner et al.

(10) Patent No.: US 6,625,299 B1
(45) Date of Patent: Sep. 23, 2003

(54) AUGMENTED REALITY TECHNOLOGY

(76) Inventors: Jeffrey Meisner, 3113 40th Ave. S., Minneapolis, MN (US) 55406-2224; Walter P. Donnelly, 6108 Sherman Cir., Edina, MN (US) 55436; Richard Roosen, 2541 Aldrich Ave. South, #2, Minneapolis, MN (US) 55405

( * ) Notice: Subject to any disclaimer, the term of this patent is extended or adjusted under 35 U.S.C. 154(b) by 0 days.

(21) Appl. No.: 09/286,817

(22) Filed: Apr. 6, 1999

(Under 37 CFR 1.47)

Related U.S. Application Data
(60) Provisional application No. 60/081,051, filed on Apr. 8, 1998.

(51) Int. Cl.$^7$ ............................................. G06K 9/00
(52) U.S. Cl. ........................................ 382/103; 348/169
(58) Field of Search ................................. 382/100, 154, 382/103, 252, 191, 306, 115; 380/28, 287, 252, 135, 253, 54, 202, 200; 348/169, 170, 171, 172; 702/153, 152

(56) References Cited

U.S. PATENT DOCUMENTS

| | | |
|---|---|---|
| 5,227,985 A | 7/1993 | DeMenthon |
| 5,235,513 A | 8/1993 | Velger et al. |
| 5,373,857 A | 12/1994 | Travers et al. |
| 5,412,569 A * | 5/1995 | Corby, Jr. et al. ...... 364/424.01 |
| 5,550,758 A | 8/1996 | Corby, Jr. et al. |
| 5,577,981 A | 11/1996 | Jarvik |
| 5,644,324 A | 7/1997 | Maguire, Jr. |
| 5,706,195 A | 1/1998 | Corby, Jr. et al. |
| 5,732,227 A | 3/1998 | Kuzunuki et al. |
| 5,736,982 A | 4/1998 | Suzuki et al. |
| 5,742,263 A * | 4/1998 | Wang et al. .................... 345/8 |
| 5,745,387 A | 4/1998 | Corby, Jr. et al. |
| 5,815,411 A | 9/1998 | Ellenby et al. |
| 5,912,650 A * | 6/1999 | Carollo ........................ 345/7 |
| 6,064,749 A * | 5/2000 | Hirota et al. ............... 382/103 |

FOREIGN PATENT DOCUMENTS

| | | |
|---|---|---|
| EP | 0 597 715 A1 | 5/1994 |
| EP | 0 631 214 A1 | 12/1994 |

OTHER PUBLICATIONS

Meyer et al., A Survey Of Position Trackers, Presence, Spring 1992, 173–200, vol. 1, No. 2, The Massuchussetts Institute of Technology, USA.

(List continued on next page.)

*Primary Examiner*—Jayanti K. Patel
*Assistant Examiner*—Seyed Azarian
(74) *Attorney, Agent, or Firm*—Knoble & Yoshida, LLC

(57) ABSTRACT

A tracker system for determining the relative position between a sensor and an object surface, generally comprising a sensor or sensors for detecting a pattern of fiducials disposed on an object surface and a processor connected to the at least one sensor. An augmented reality system generally comprising a pattern of fiducials disposed on an object surface, a computer having a processor and a memory, a user interface for receiving input and presenting augmented reality output to a user, and a tracker for detecting the pattern of fiducials. A method for tracking the position and orientation of an object generally comprising the steps of scanning across an object to detect fiducials and form video runs, clumping video runs to detect a pattern of fiducials, acquiring estimated values for a set of tracking parameters by comparing a detected pattern of fiducials to a reference pattern of fiducials, and iterating the estimated values for the set of tracking parameters until the detected pattern of fiducials match the reference pattern of fiducials to within a desired convergence. A method for augmenting reality generally comprising the steps of disposing a pattern of fiducials on an object surface, tracking the position and orientation of the object, retrieving and processing virtual information stored in a computer memory according to the position and orientation of the object, and presenting the virtual information with real information to a user in near real time.

28 Claims, 12 Drawing Sheets

OTHER PUBLICATIONS

Trisen Systems, Inc., Augmented Reality, The Next Generation in Wire Harness Assembly, TriSen Systems Brochure, 1998, USA.

Sprovieri, Harness Assembly Gets a Heads Up, Assembly Magazine, May 1998, Cahners Business Information, USA (Incorporated into TriSen Systems Brochure).

Pretlove et al., Integrating Augmented Reality & Telepresence For Telerobotics in Hostile Environments, First International Workshop on Augmented Reality, Jul. 1998, 1–5.

Reiners et al., Augmented Reality For Construction Tasks: Doorlock Assembly, Jul. 1998, 1–13.

Berger et al., Computer–Vision–Enabled Ophthalmic Augmented Reality: A PC–Based Prototype, Date Unknown, 1–15.

Cho et al., A. Multi–Ring Color Fiducial System And A Rule–Based Detection Method For Scalable Fiducial–Tracking Augmented Reality, Date Unknown.

Ferrin, Survey of Helmet Tracking Technologies, Date Unknown.

Hoff, Fusion Of Data From Head–Mounted And Fixed Sensors, Date Unknown.

Mackay et al., Designing Interactive Paper: Lessons From Three Augmented Reality Projects, Date Unknown.

Park et al., Natural Feature Tracking For Extendible Robust Augmented Realities, Date Unknown.

Satoh et al., Case Studies Of See–Through Augmentation In Mixed Reality Project, Date Unknown, 1–15.

Starner et al., Augmented Realities Integrating User And Physical Models, Date Unknown, 1–7.

Sundareswaran et al., Visual Servoing–Based Augmented Reality, Date Unknown.

* cited by examiner

AUGMENTED REALITY TECHNOLOGY

This application claims the benefit of provisional application 60/081,051 filed Apr. 8, 1998.

BACKGROUND OF THE INVENTION

1. Field of the Invention

The present invention relates, generally, to tracking apparatus and methods and to augmented reality (AR) technology for integrating or augmenting real information such as actual or captured real-world images with virtual information such as images of computer-generated objects. More particularly, the invention relates to a fiducial-based tracker or to a fiducial-based means for registering the virtual-world information to the real-world information within an AR system.

2. Background Information

AR technology allows a person to see or otherwise sense a computer-generated virtual world integrated with the real world. The "real world" is the environment that an observer can see, feel, hear, taste, or smell using the observer's own senses. The "virtual world" is defined as a generated environment stored in a storage medium or calculated using a processor. A tracker system within the AR technology registers the virtual world to the real world to integrate virtual and real information in a manner usable by the observer.

AR technology essentially "connects" a human user to a database or to a virtual or partially virtual environment using any combination of the human user's visual or aural or kinesthetic senses. Alternatively, AR technology can be viewed as connecting the partially virtual environment to the real environment as observed by the human user. AR technology allows the human user to perceive and be guided by processed database information that is integrated with the real world. Additionally, AR technology may enable a human to participate in an activity in a virtual world by translating the human user's movements or activity within a defined area or volume of the real world into the desired response in the virtual world.

Visual AR technology includes "Video See Through" AR technology and "Optical See Through" AR technology. Video See Through AR technology uses a camera to capture real world images and electronically adds or integrates the virtual images to create the augmented image. Optical See Through AR technology projects the virtual images on a see-through display, enabling a human user to see the projected image of the virtual object on the display and the images of the real world objects through the display.

By allowing a human to quickly, accurately and appropriately retrieve and apply virtual information to a problem, a task or situation in the real world, AR technology provides significant benefits in a society that is being inundated with information. For example, because of the quick development of many new technologies, the time required to train a person or to assemble and service complex products is increasing. New products are being quickly introduced into the market while many older generations of products are being concurrently used by the general public. An AR system can augment or enhance the real world view of the equipment with instructional text, drawings and diagrams to enable service professionals to quickly, accurately, and competently work on the equipment. There are many other examples of the benefits provided by the AR technology, including but not limited to the following examples. The invention can be used to improve the efficiency and quality of assembling or inspecting components such as televisions, radios, computers, and other components. Similarly, the invention can be used to improve the efficiency and quality of servicing or maintaining systems by superimposing text, pictures, drawings, schematics, and other information from maintenance manuals, for example, upon a real-world object. An AR system can be used to simulate real world activities, such as piloting aircraft or ships, and further can be used for instructional training, education, or rehearsals. Additionally, the invention can be used to create games or other entertainment, or to form an artistic medium by capturing and manipulating the artist's motions. Furthermore, the invention can be used to document head and eye responses to stimuli by tracking and recording the motion of either the user's head or the user's pupil after a stimuli has been introduced.

The AR system of the present invention has been used to fabricate wire harnesses for commercial airline planes. Each commercial airliner typically contains hundreds of wire bundles and hundreds of miles of wire. As shown in FIG. 3, the known art requires an assembly worker to bundle the wires around pegs formed on plywood boards by viewing printouts of wiring diagrams and transposing the information to the board. The known method for fabricating wire harnesses is a slow and tedious process that can result in expensive and time-consuming mistakes, and contributes to the billions of dollars that the airline industry loses because of production delays. The boards are specially designed for various wire harnesses, and must be stored. However, the wire harness fabrication AR system embodiment of the present invention has been shown to reduce cycle time by fabricating quality wire harnesses up to 50% faster than the current methods, and enables planes, particularly the wire harnesses, to be quickly designed and produced according to the special requirements of a customer.

An AR system should allow a human user to easily and naturally interact with objects in both the real and virtual world. Therefore, a visual AR system should: (1) quickly and accurately detect and track input data such as coordinate marks or fiducials; (2) quickly process the input data to determine the relative position and orientation between the user and the target objects and register the virtual world objects to the real world objects; and (3) quickly and smoothly integrate the virtual world objects with the real world objects either by displaying or projecting an image of the virtual world objects over the real world objects or by electronically combining an image of the virtual world objects with a captured imaged of the real world objects. Therefore, an AR system should have a small latency period and a quick update rate. "Latency" is defined as the period of time between the moment when the input data is captured and the moment that the augmented information is displayed or otherwise presented in usable form to the user. "Update rate" is defined as the frequency of refreshing the displayed or otherwise presented information that is processed from new input data. Humans perceive their environment with an essentially continuous update rate and zero latency period. Therefore, a human will be able to easily and naturally interact with an AR system that has an update rate and latency period approaching a human's natural capabilities; i.e. "real time" or "near real time." An update rate of at least 60 Hertz and a latency period of 16 milliseconds or less is considered "near real time."

Known trackers include magnetic-based, moving infrared beam optical-based, light source (LED) optical-based, ultrasonic-based, and mechanical-based trackers. Problems associated with these trackers generally include stray fields, noise, cost, insufficient accuracy, and limited mobility. Magnetic or moving infrared beam optical based trackers have been used in fighter aircraft and helicopters. These trackers accurately measure the user's pose with update rates of twenty Hertz or greater, but are complex systems that work within a very limited volume and severely limit the mobility of a user. Furthermore, magnetic-based trackers are sensitive to and their accuracy may be detrimentally affected by metallic objects in the vicinity of the sensors. Light source-based trackers use a camera to track various light source patterns, such as Light Emitting Diode (LED) arrays, that are placed on a surface of a target object. These light sourcebased trackers are effective in limited volumes and severely restrict the movement of the user. Additionally, these trackers have a limited accuracy and a latency greater than 100 milliseconds. Ultrasonic-based trackers are subject to noise interference in practical environments. The light source-based and ultrasonic-based trackers use "beacons" or "active" fiducials. An active fiducial generates a signal that is detectable by a sensor. Mechanical tracking systems, comprising a pantograph arm attached to a head mounted display, have been used in U.S. Army gunship helicopters. These mechanical-based trackers also severely restrict the mobility of the user.

Applicants' invention provides an AR system, including a fiducial-based tracker system, which is believed to constitute an improvement over existing technology.

BRIEF SUMMARY OF THE INVENTION

The present invention provides an apparatus and method for tracking the position and orientation between at least one sensor and at least one object, wherein either, or both, the sensor and the object may be mobile. The tracker system of the present invention is used as a means for registering virtual information to real world information within an augmented reality (AR) system. Proper registration in an AR system enables a user to correctly view a virtual scene and be guided to properly place or otherwise interact with real objects in an augmented view. The registration process conducted by the tracker system calculates six tracking parameters that determines the relative position and orientation between at least one real world object or target and at least one sensor. The tracking parameters include three orientation parameters (the angles phi, theta and psi) and three position parameters (distance [L] and the intercept of the user's line of sight with the fiducial plane [X-bar and Y-bar]). The tracker system continuously calculates or tracks these parameters because the target(s) and/or the sensor(s) are mobile.

An AR system operates within a volume formed by boundaries defined by the position of the sensor(s) and the tracked, real world object(s). The tracking system may be designed as either a 2-dimensional or 3-dimensional tracker. Additionally, the tracking system may use monocular or binocular optics to display data. The 2-dimensional tracker tracks the position of objects on an object plane, such as a wiring board. The 3-dimensional tracker tracks the position of objects on or in an object volume. The monocular AR system projects an image into one eye. The binocular tracker projects slightly modified augmented images to both eyes to enhance the augmented view with depth perception. A monocular AR system incorporating the 2-dimensional tracker may be used to fabricate a wire harness for a vehicle, aircraft, or other object. Fiducials are placed on or near the board on which the wire harness is assembled. The augmented reality technology allows a human to simultaneously view a virtual image identifying the correct wire path. Additionally, a monocular AR system incorporating the 2-dimensional tracker may be used to enhance the reading and interpretation of maps and charts. Virtual legends and text may be superimposed on a map or a virtual map may be superimposed over the real world objects. For example, a field soldier may view virtual images or information about troop movements generated by current military intelligence while viewing a real world map, and then switch perspective and begin looking around at the real world field with a virtual map properly oriented and superimposed over his current field of vision. Other examples of enhanced processes include inspection of parts and electrical panel wiring. A monocular AR system incorporating the 3-dimensional tracker may be used to wire fuselages. A binocular AR system incorporating either a 2-dimensional or 3-dimensional tracker may be used to enhance medical processes and devices, such as endoscopes and surgical devices.

The tracker system generally comprises a sensor or sensors for detecting a pattern of fiducials disposed on an object surface and a processor connected to the sensor. The sensor has a position and an orientation with respect to the pattern of fiducials on the object surface, which is identified by the processor by acquiring or matching a detected pattern of fiducials with a reference pattern of fiducials. The reference pattern of fiducials may be stored in a computer memory as a data file. In a preferred embodiment, the pattern of fiducials includes a geometrically consistent hard fiducial pattern and a pseudo random soft fiducial pattern. The hard fiducial pattern is used to identify the phi, theta, and psi orientation parameters and the L position parameter. The soft fiducial pattern is used to identify the X-bar and Y-bar position parameters.

The AR system generally comprises a pattern of fiducials disposed on an object surface, a computer having a processor and a memory, an interface for receiving input and presenting AR output to a user, and a tracker system for detecting the pattern of fiducials and determining the relative position between the user and the target object. The tracker includes at least one sensor for detecting the pattern of fiducials. The sensor is electrically connected to the computer, and has a position and an orientation with respect to the pattern of fiducials on the object surface. The processor identifies the position and the orientation of the sensor with respect to said object surface by matching a detected pattern of fiducials with a reference pattern of fiducials stored in the memory of the computer. In a preferred embodiment, the pattern of fiducials includes a geometrically consistent hard fiducial pattern and a pseudo random soft fiducial pattern, the computer is a wearable computer, the interface has an update rate of at least 60 Hertz and a latency below 16 milliseconds, and the sensor is an optical sensor or camera capable of detecting passive fiducials.

The method for tracking the position and orientation of an object generally comprises the steps of scanning across an object to detect fiducials and form video "runs," clumping video runs to detect a pattern of fiducials, acquiring estimated values for a set of tracking parameters by comparing a detected pattern of fiducials to a reference pattern of fiducials, and iterating the estimated values for the set of tracking parameters until the detected pattern of fiducials match the reference pattern of fiducials to within a desired convergence. In a preferred embodiment, the step of clumping video runs includes the steps of combining adjacent video runs and only recording pixels having a video level above a predetermined threshold. The step of acquiring estimated values for a set of tracking parameters includes the steps of corresponding a predetermined number of detected hard fiducials with a reference pattern of fiducials to estimate the orientation parameters and the distance position parameter, and electing at least one of the soft fiducials with the reference pattern of fiducials to estimate the X-bar and Y-bar position parameters.

The method for augmenting reality generally comprises the steps of disposing a pattern of fiducials on an object surface, tracking the position and orientation of the object, retrieving and processing virtual information stored in a computer memory according to the position and orientation of the object, and presenting the virtual information and the real information to a user in near real time. In a preferred embodiment, the pattern of fiducials include a geometrically consistent hard fiducial pattern and a pseudo random soft fiducial pattern; and the steps of tracking the position and orientation of the objection, retrieving virtual information, and presenting the virtual information with real information are performed with an update rate of at least 60 Hertz and a latency below 16 milliseconds.

The features, benefits and objects of this invention will become clear to those skilled in the art by reference to the following description and drawings.

DETAILED DESCRIPTION

Figure 1:
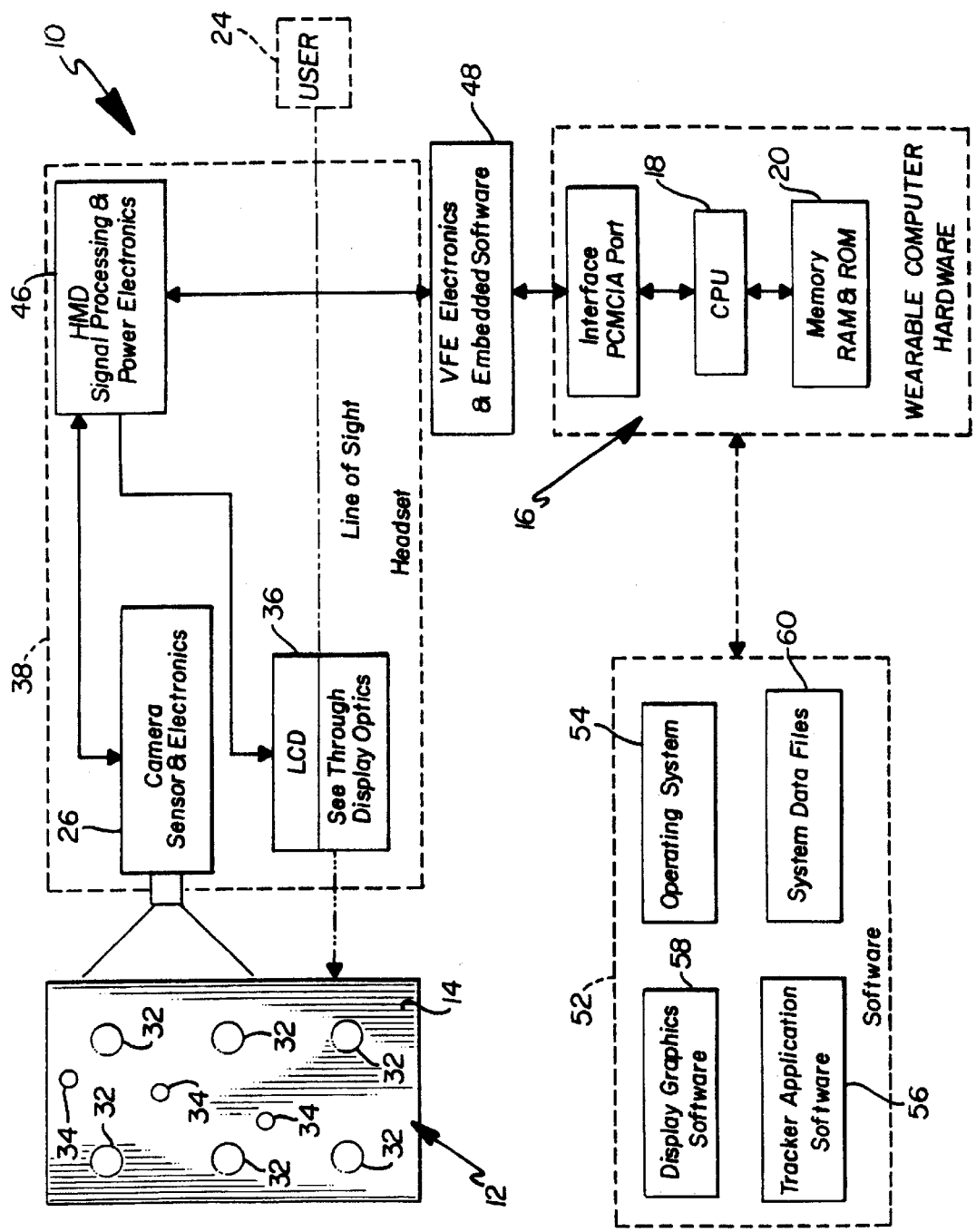
FIG. 1 is a schematic diagram illustrating the tracker and the AR systems of the present invention.

The present invention provides a tracker system and an augmented reality (AR) system. Referring to FIG. 1, an example of a preferred embodiment of the AR system that incorporates embodiment of the tracker system is illustrated and generally indicated by the reference numeral 10. The AR system 10 is described below first in terms of its major structural elements and then in terms of its secondary structural and/or functional elements which cooperate to track the position and orientation of an object, retrieve and process virtual information according to the position and orientation of the object, augment the real information with the virtual information, and present the augmented information.

The tracker system, or tracker, identifies the relative position and orientation between at least one sensor and at least one target object. Either, or both, the sensor(s) and the object(s) may be mobile. The tracker system provides a means for registering virtual information to real world information within the AR system, which enables a user to correctly view a virtual scene and be guided to properly place or otherwise interact with real objects in the augmented view. The registration process performed by the tracker calculates six tracking parameters that determines the relative position and orientation between real world object(s) or target(s) and the sensor(s), and continues to calculate these parameters to determine the relative position(s) of the mobile target(s) and/or the sensor(s). An AR system operates within a volume formed by boundaries defined by the position of the sensor(s) and the tracked, real world object(s). The tracker may be used to track the position and orientation of a person's head, field of view, or any mobile or moveable object or being with the volume. The AR system uses the position and orientation information provided by the tracker to display, for example, the correct location to place an object, the appropriate view in a virtual scene, or visual instructions to guide a user to achieve a desired hand-eye coordinated result.

The figures illustrate an embodiment of a visual AR system, particularly a wire harness fabrication AR embodiment. Other uses of the AR system are anticipated for various applications and are believed to fall within the teaching of the tracker system and the AR system described herein. Although the figures the following specification are directed toward a visual AR system, the AR system may be adapted to augment information directed toward any single or any combination of a human user's means for sensing the environment, including the visual, aural, and kinesthetic senses.

Referring again to FIG. 1, the AR system 10 generally comprises a pattern of fiducials 12 disposed on an object surface 14, a computer 16 having both a processor 18 and a memory 20, an interface 22 for receiving input and presenting augmented reality output to a user 24, and a tracker for detecting the pattern of fiducials 12 and identifying the relative position and orientation between an object or object surface 14 and the user 24, for example. The tracker generally includes at least one sensor 26 for detecting the pattern of fiducials 12 and the processor 18 of the computer 16. The sensor 26 is electrically connected to the computer 16, has a position and an orientation with respect to the pattern of fiducials 12 on the object surface 14, and generates a signal that corresponds to the pattern of fiducials 12 as detected by the sensor 26. The tracker calculates the tracking parameters that determine the position and the orientation of the sensor 26 with respect to the object surface 14 by matching the detected pattern of fiducials with a reference pattern of fiducials stored in the memory 20 of the computer 16. In the wire harness fabrication AR system, the object surface 14 may comprise the wiring board shown in FIGS. 4, 6, and 9–14. However, any 2-dimensional or 3-dimensional form, shape or volume may function as the object surface 14.

Referring to FIGS. 1, 4 and 15–18, the computer 16 is preferably a wearable computer that provides mobility to a user 24 of the AR system 10. A user interface, including a display 36 and an actuation or selection device, is attached to the computer 16. The figures illustrate an embodiment where the sensor 26 and the display 36 are attached to a headset 38. The computer 16 accounts and compensates for the offset between the sensor 26 and the display 36 on the headset 38 to properly register or align the virtual image to the real image and form an augmented view for the user 24. By calculating and applying the appropriate offset, the tracker can identify the position of the user 24, the user's eyes, or other objects or beings. This offset may be accurately determined for a particular user by having the user 24 align a virtual T-mark with a real T-mark 62 in a start-up routine. It is noted that the pupils of the user's eyes may themselves form a fiducial that is tracked by a sensor having a known position and orientation, allowing the direction of the user's eyes or the user's field of vision to be determined. Therefore, the user 24 may provide input to the AR system 10 merely by changing his or her direction of gaze.

Figure 6:
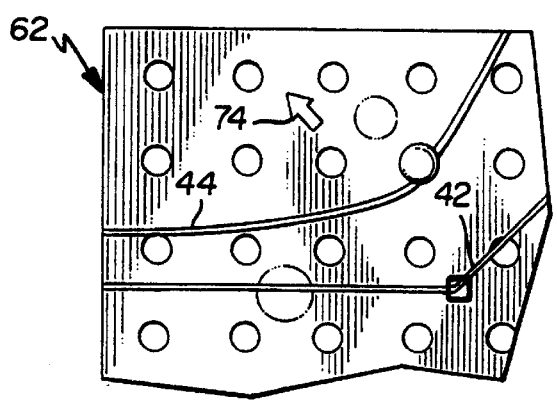
FIG. 6 illustrates the augmented view of a virtual image of a wire path superimposed over a real world image of the wiring board and a real wire.

The head-mounted display 36 may comprise either a Video See Through display or an Optical See Through display. With regard to the Video See Through display, the processor 18 in the computer 16 combines virtual object information 42 with real object information 44, which may have been captured by a camera for example, and then projects or otherwise presents the augmented information or view 62 to the user 24. With regard to the Optical See Through display, the processor 18 in the computer 16 projects or otherwise presents the virtual object information 42 onto the display 36 and the user 24 views real object information 44 through the display 36. FIG. 6 illustrates the augmented view 46 presented by the Optical See Through display 36, which is incorporated into the design shown in the figures. The headset 38 preferably is adjustable, weighs less than 1½ pounds, and has an evenly distributed or balanced weight allowing a user 24, such as an assembly worker, to comfortably wear the headset 38 for long periods of time. Additionally, the headset 38 design shown in the figures will not interfere with contacts or eyeglasses worn by a user 24.

As shown in FIGS. 1 and 15–18, signal processing and power electronics 46 are also attached to the headset 38. These electronics 46 provide electrical power to all of the electrical components in the headset 38, process the input signals corresponding to a detected pattern of fiducials generated by the optical sensor or camera 26, transmit the input signals to the computer 16, and process the output video signals generated by the computer 16 to the head-mounted display 36 where the augmented information is presented to the user 24.

Figure 5:
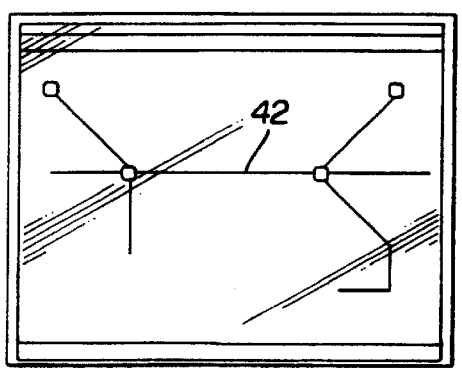
FIG. 5 illustrates a WireCAD screen display used to create virtual images of wire harness schematics in an embodiment of FIG. 4.

Various software 52 operates within the computer 16, including an operating system 54 to control memory management, scheduling, input and output, and other activities of the computer 16, a tracker application software program 56 used to continuously calculate the tracking parameters that determine the position and orientation of the sensor and the objects, a display graphics software program 58 used to form and/or present the augmented information to the user 24, and system data files 60 containing, among other information, data identifying a reference pattern of fiducials corresponding to the pattern of fiducials 12 on the object surface 14 and data related to the virtual information that is integrated with real information. In the embodiment shown in the figures, the tracker application software program 56 performs routines to determine and track the position and orientation of the head mounted sensor with respect to the object surface(s) 14 where the pattern of fiducials 12 are located. The tracker application software program 56 is preferably a terminate-stay-resident program that continuously operates in the memory 20 of the computer 16 in order to continuously track the target object(s) 14 and other objects or beings. The processor 18 uses system data files to account and compensate for the offset between the sensor 26 and the display 36 on the headset 38 to determine the field of view for the user 24. The display graphics software 58 retrieves or otherwise generates the appropriately registered virtual image to be integrated with the real images in the current field of view of the user 24, and presents the augmented image to the user 24 using the display 36. The virtual image may be converted or extracted from a CAD drawing, such as a WireCAD design drawing for the wire harness fabrication AR system. FIG. 5 illustrates a WireCAD screen display of a wire representation for a wire harness design.

As shown in the augmented view 62 of FIG. 6 that is presented on an Optical See Through display 36, the tracker accurately registers the field of view of the user 24 with respect to the real object 14 (a wiring board). The virtual image 42 (a WireCAD generated wire representation) overlays the object plane where the real object 44 (wire) should be placed. The wiring harness fabrication AR system embodiment has been shown to function in a volume of 4 feet×60 feet×4 feet, to accurately superimpose virtual wires 42 over the real world wiring board 14 to within 0.2 inch of the desire location, and to operate in "near real time" by having an update rate of approximately 60 Hertz and a latency period of approximately 16 milliseconds. The fiducial-based tracking system of the present invention is scaleable to accommodate larger or smaller volumes and a variety of volume forms. Therefore, the AR system can be modified to function within other volumes as required by a particular application.

Figure 7:
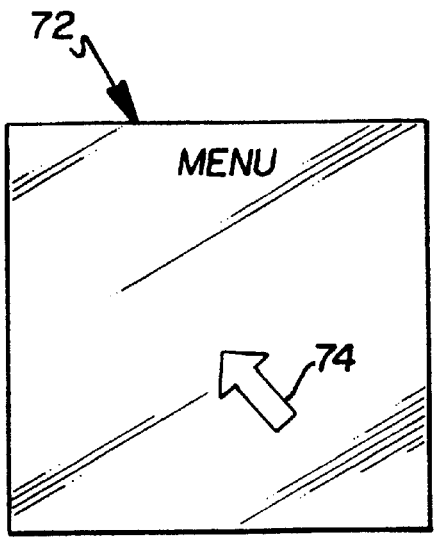
FIG. 7 illustrates a menu driven interface used in the AR system.
Figure 8:
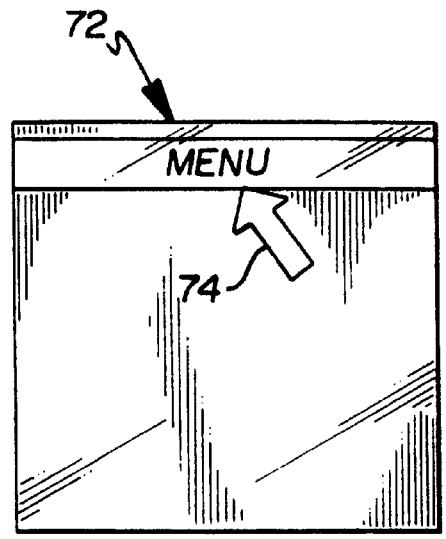
FIG. 8 illustrates the menu driven interface of FIG. 6 with a cursor placed over the MENU selection which is thereby activated for selection.
Figure 9:
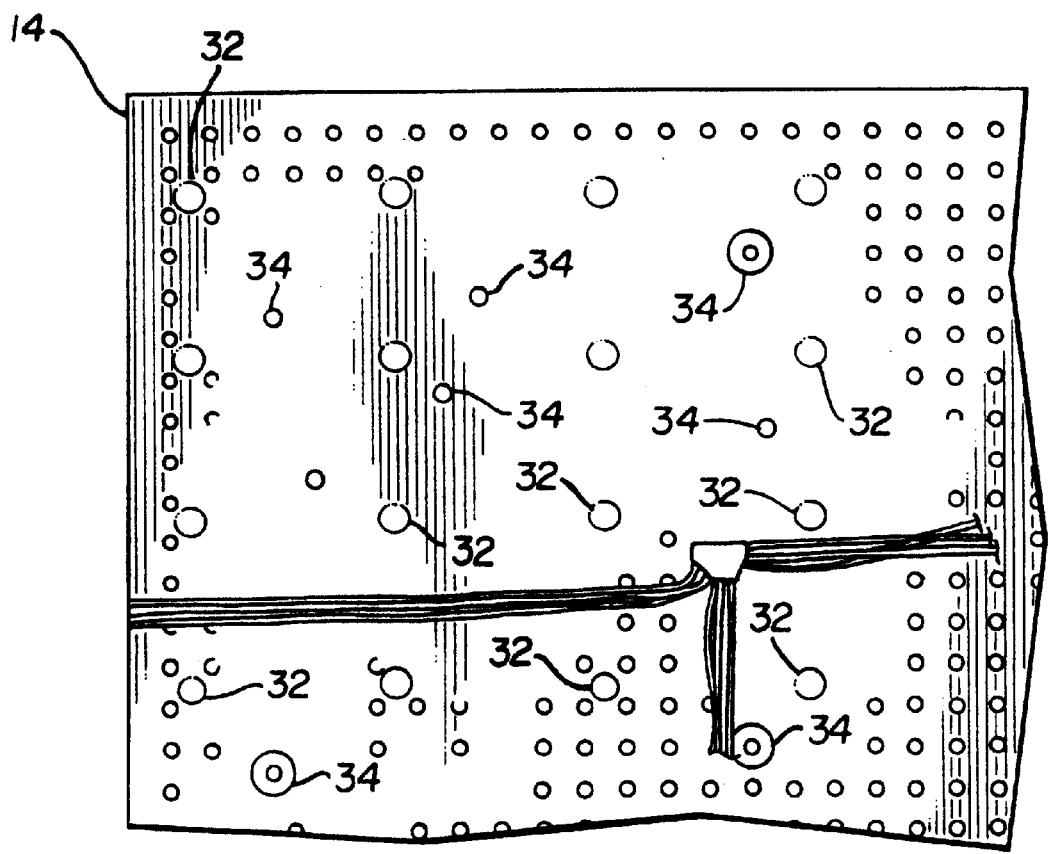
FIG. 9 is an illustration of an excerpt of a wiring board used in a wire harness fabrication AR system on which a wire harness is being assembled.
Figure 10:
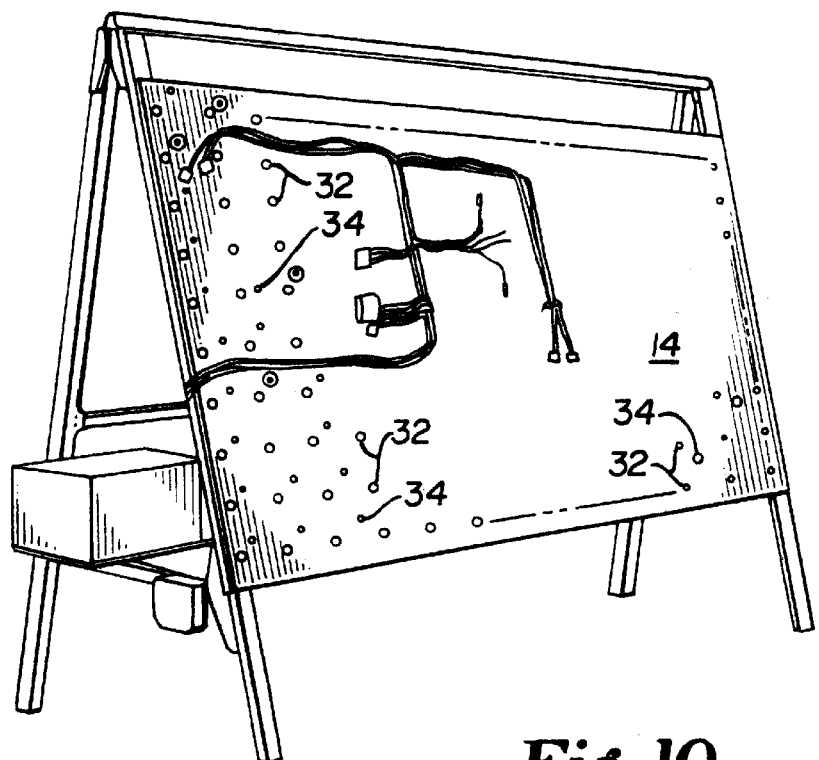
FIG. 10 is another view of the illustration of FIG. 9.
Figure 11:
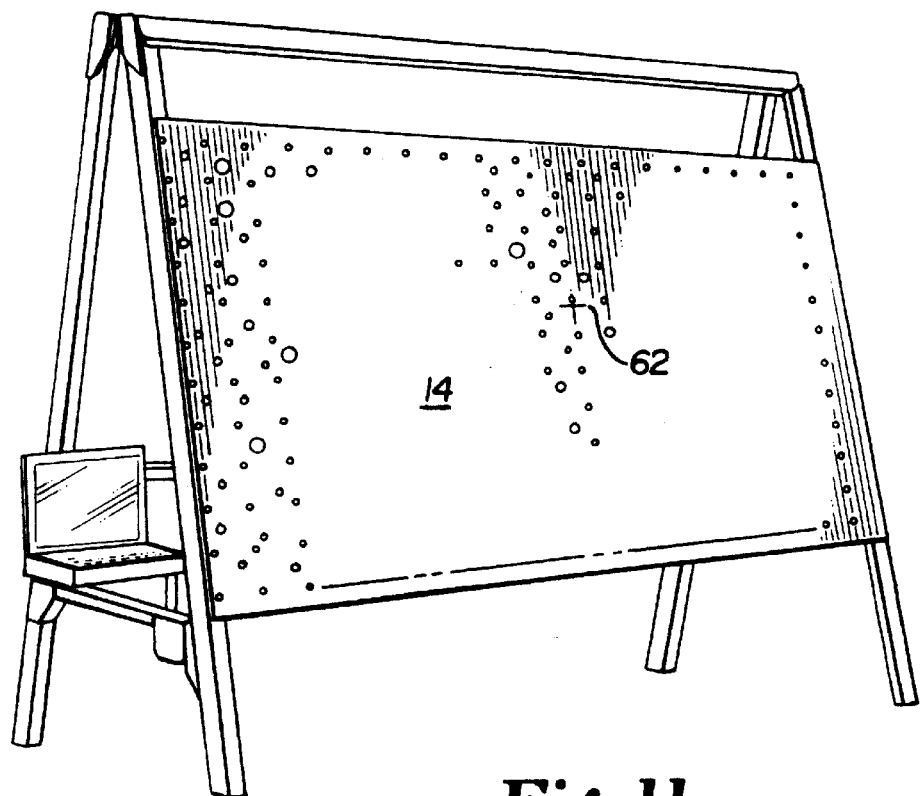
FIG. 11 is an illustration of a wiring board used in a wire harness fabrication AR system.
Figure 13:
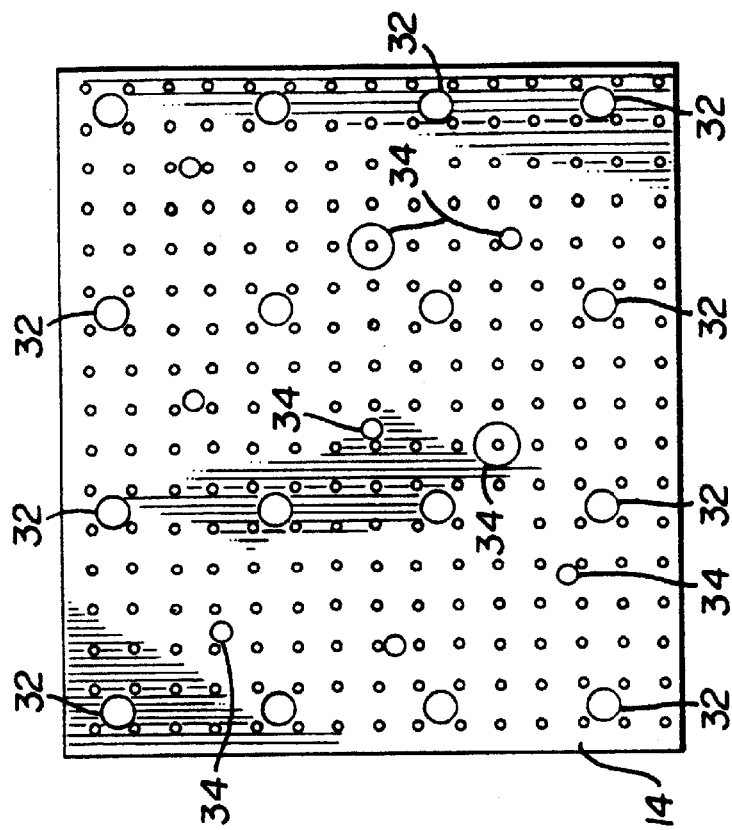
FIG. 13 is an illustration of the fiducial pattern on a wiring board.
Figure 12:
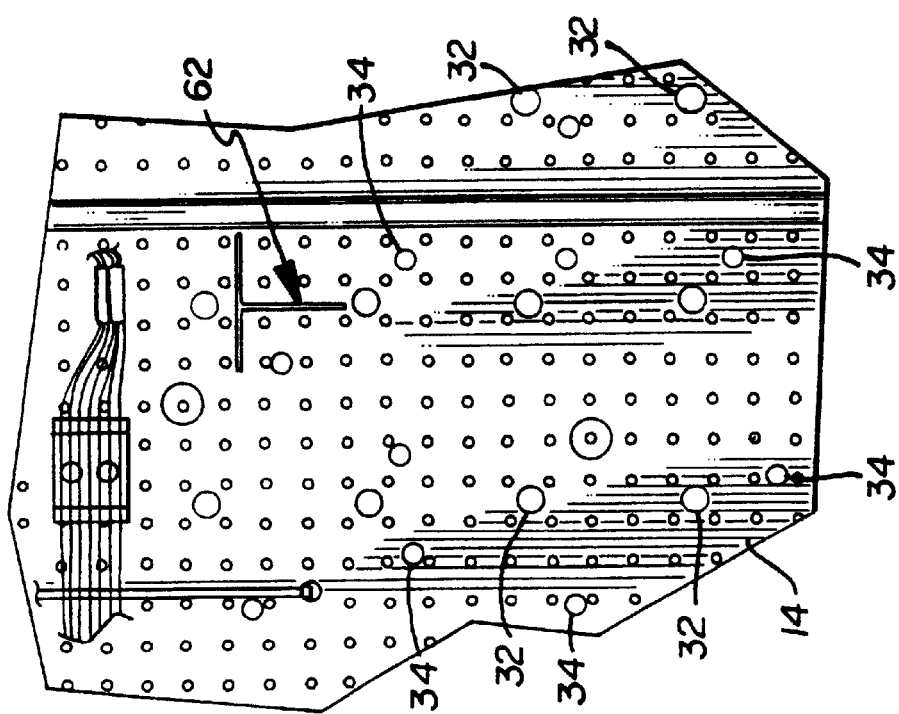
FIG. 12 is an illustration of an excerpt of a wiring board used in a wire harness fabrication AR system, showing the assembly of another wire harness.
Figure 15:
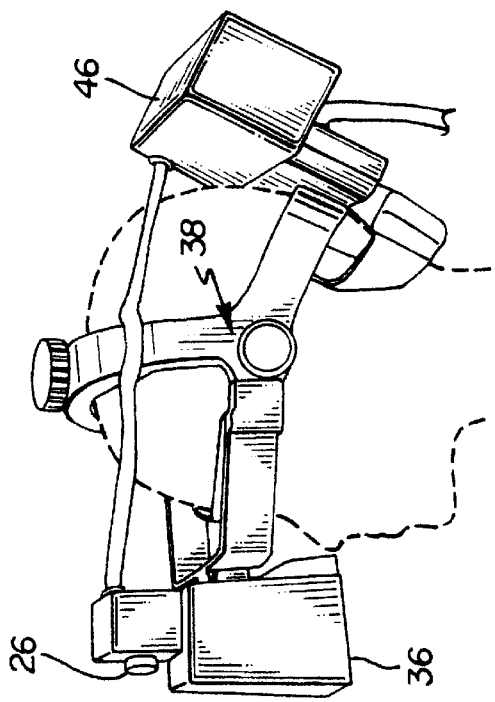
FIG. 15 is a side view of a head mounted display of the present invention.
Figure 14:
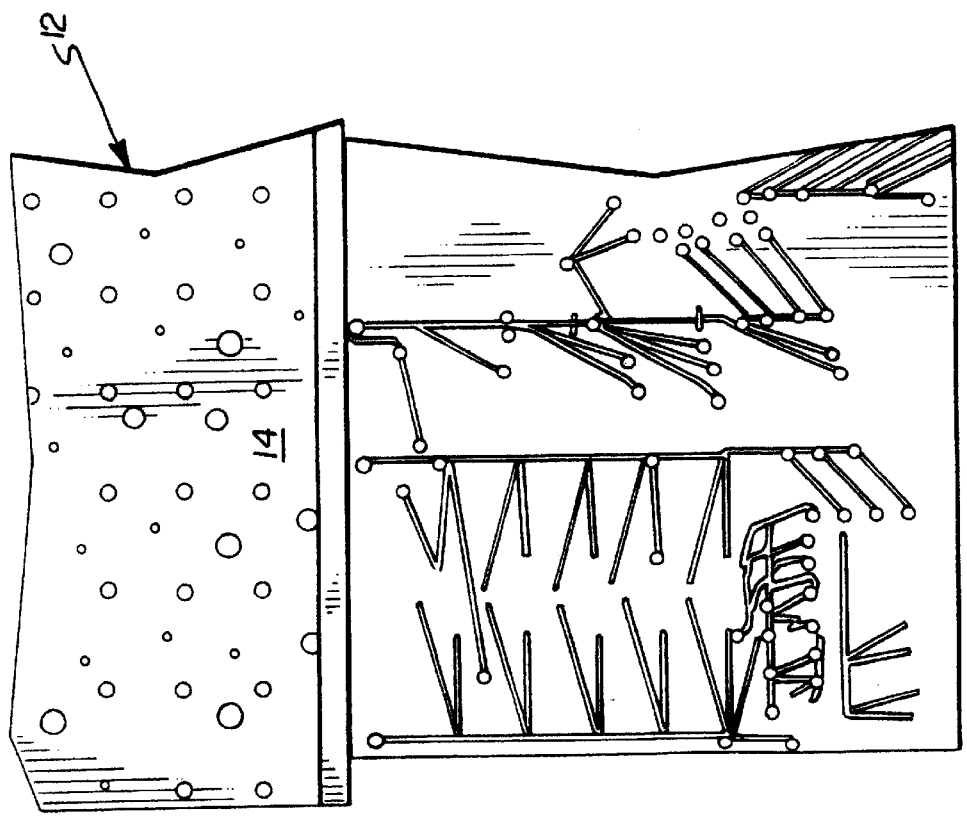
FIG. 14 is an illustration of a wiring board for use in wire harness fabrication AR system in which the fiducial pattern area and the wire harness assembly area are in separate regions.
Figure 16:
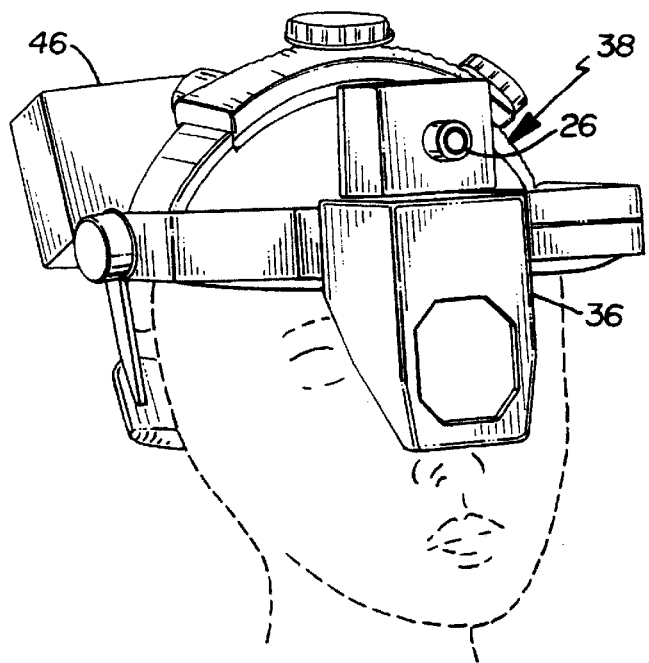
FIG. 16 is a front perspective view of the head mounted display of FIG. 15.
Figure 18:
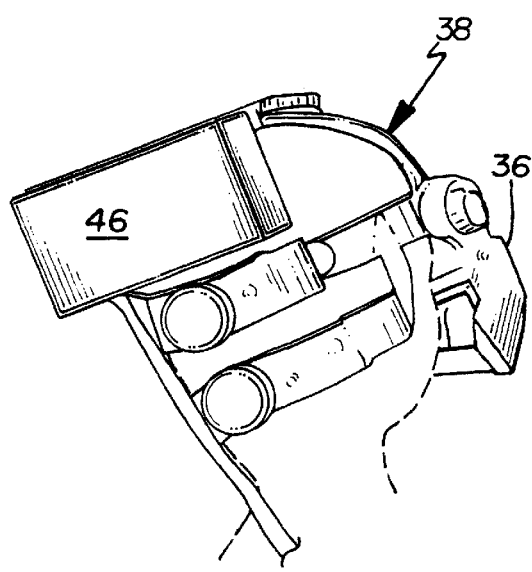
FIG. 18 is a rear perspective view of the head mounted display of FIG. 15.
Figure 17:
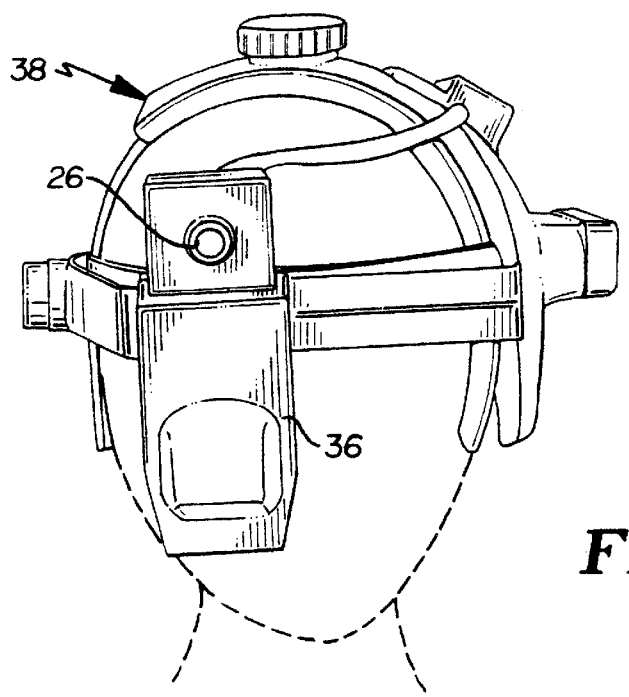
FIG. 17 is a front view of the head mounted display of FIG. 15.

Referring to FIGS. 7–8, the software 52 operating on the computer 16 may generate menu driven screen displays 72, or pull down menus, that form part of the user interface and allow a user to easily navigate through large amounts of virtual information. The display 36 can be toggled between these menu driven screen displays 72 and other augmented views. A user 24 may move the cursor 74 through body movement. In the wire harness fabrication system illustrated in the figures, for example, the user 24 moves the cursor 74 by moving his or her head. As shown in FIG. 8, the menu item is highlighted when the cursor is positioned over the item. That menu item is selected through the user actuated selector device, which may take a number of forms including a manual toggle switch, a voice recognition system, or devices for detecting eye movement. For example, a user may speak a command or blink his or her eyes to select a menu command.

Menu commands for the wire harness fabrication AR system may include: OVERVIEW, SHOW ALL SYMBOLS, PREVIOUS WIRE, CURRENT WIRE, NEXT WIRE, STATUS, CLOSE MENU, and RESTART PROGRAM. The OVERVIEW command shows the entire design for the harness, including all of the wires. The SHOW ALL SYMBOLS command shows where to place the "clecos," fixtures, or connectors. Clecos are removable pegs that fit within the pegboard. They allow a single pegboard to be easily modified for a wide variety of harness designs; whereas the wiring board for the known art are fabricated for a specific wire harness design. The PREVIOUS WIRE command shows the wire that was worked on last. The CURRENT WIRE command shows the wire that is being worked on currently. The NEXT WIRE command shows the wire to be worked on next. The STATUS command shows the overall status of the harness build. The CLOSE MENU command makes the pop down menu disappear. The RESTART PROGRAM command enables the user to choose another harness for assembly or to simply quit. These menu commands illustrate the ease of using the AR system to navigate through a complicated process and retrieve the appropriate information using the AR system.

The process of identifying and tracking the relative position between objects and the user performed by the tracker must be efficient, accurate, and "intelligent" to allow the AR system to operate in near real time. Referring again to FIG. 1, the tracker system includes the sensor(s) 26 for detecting the pattern of fiducials 12 disposed on the object surface 14, signal processing and power electronics 46, the processor 18, and further includes a video feature extractor (VFE) 48 and the tracker application software program 56 operating within the processor 18. The tracker system identifies and tracks the relative position between the target object(s), such as the surface object 14, and the sensor(s) 26 by detecting fiducials and calculating the tracking parameters.

Figure 2:
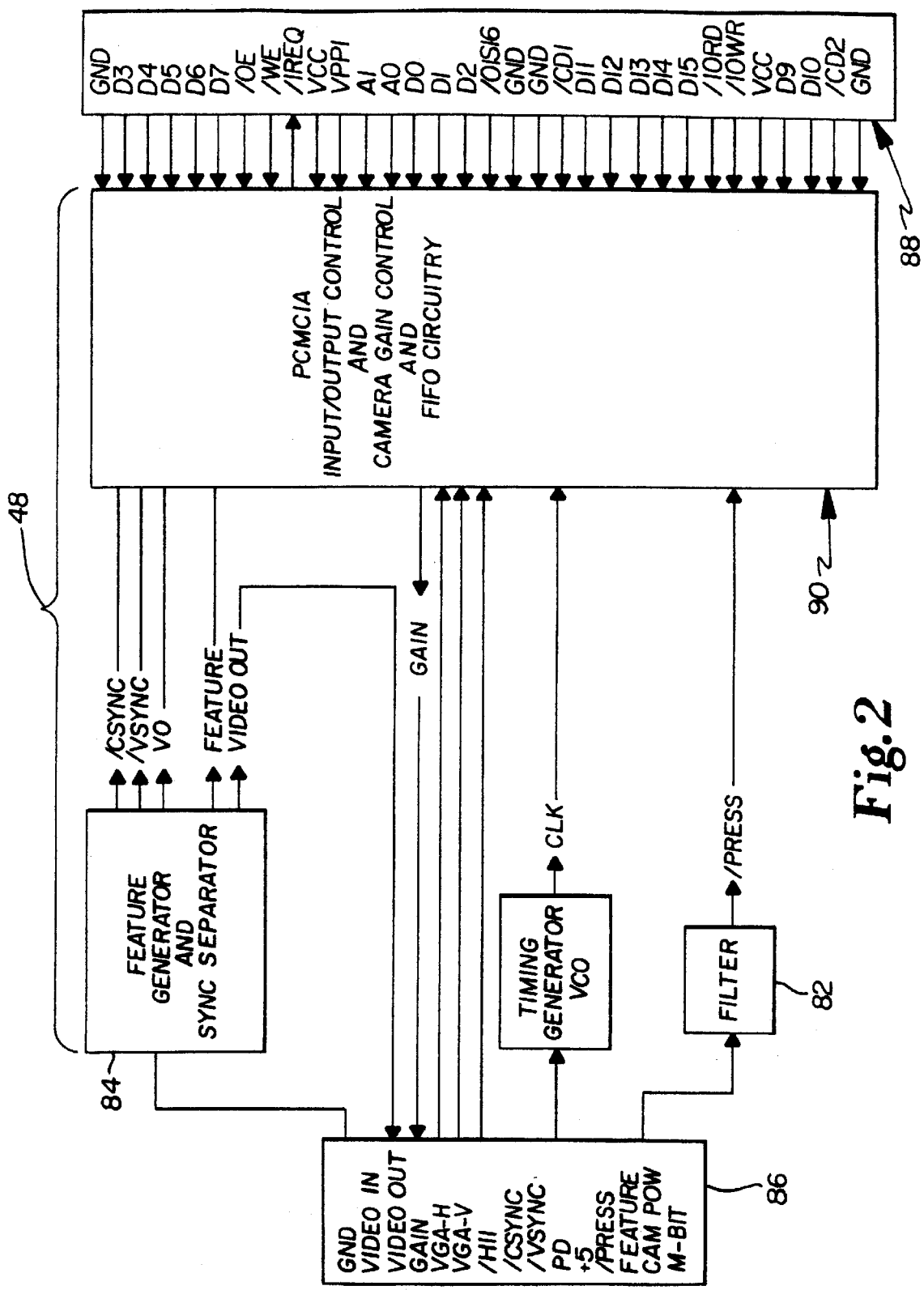
FIG. 2 is a schematic block diagram of the Video Feature Extractor (VFE) of the present invention.
Figure 3:
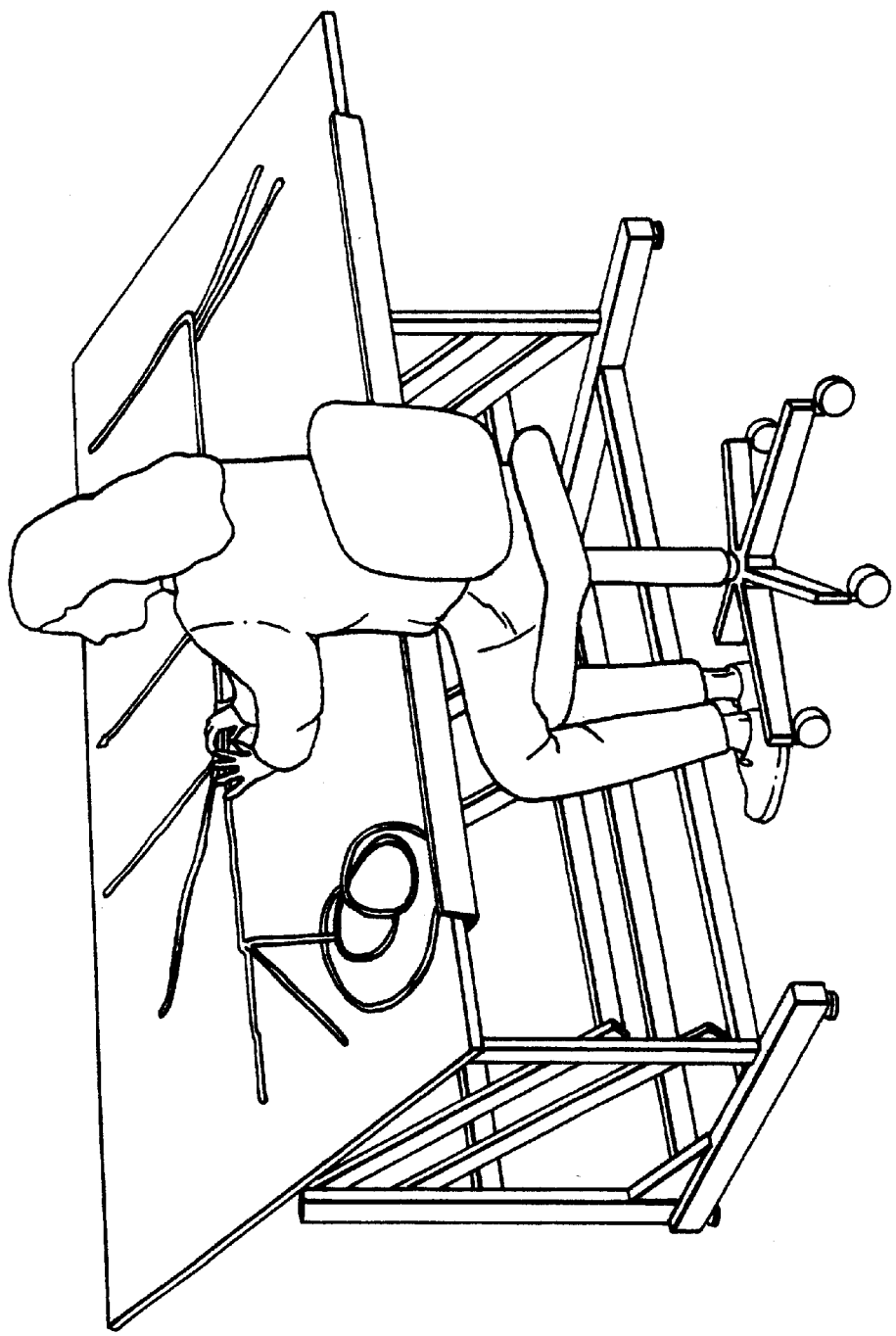
FIG. 3 illustrates a prior art method of fabricating a wire harness.
Figure 4:
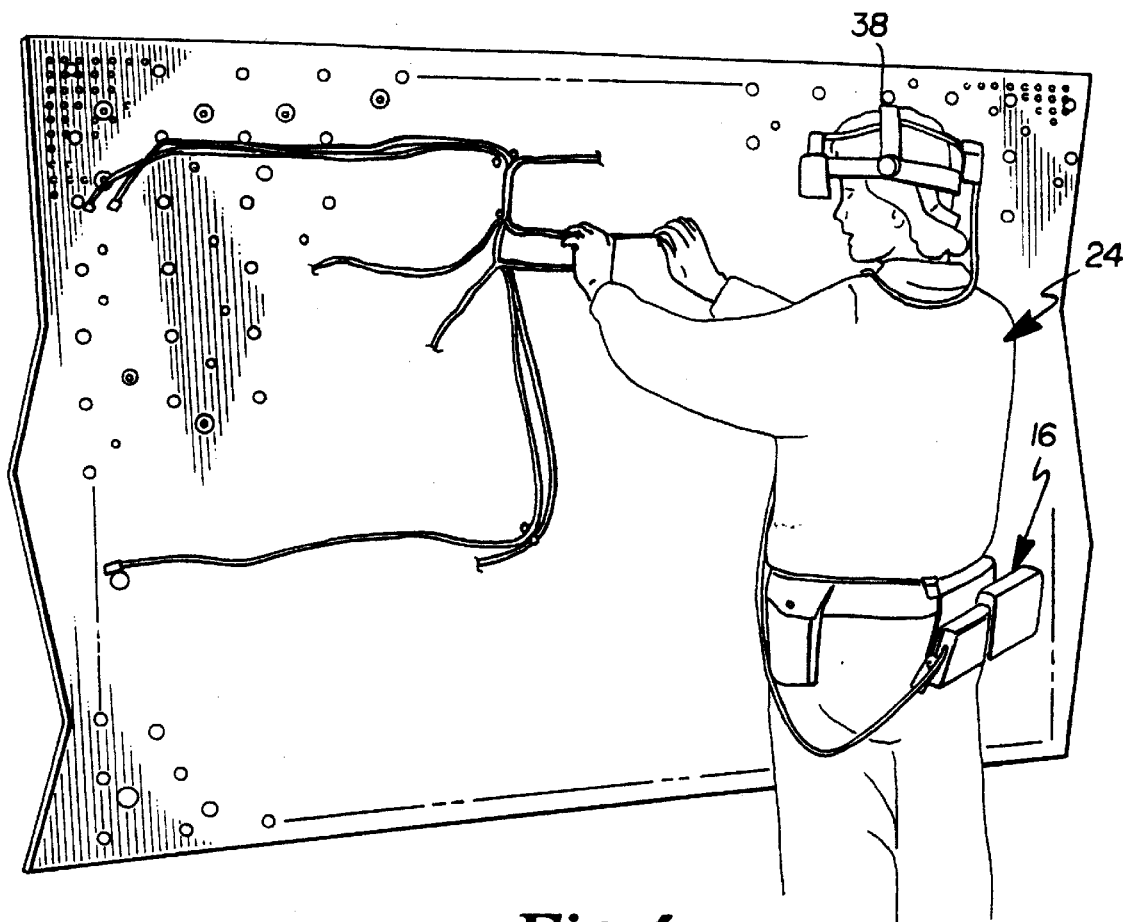
FIG. 4 illustrates a wire harness fabrication AR system embodiment of the present invention.

The signal generated by the sensor 26 is passed through the VFE 48. The VFE 48 receives and formats composite video signals from the sensor 26 or camera. FIG. 2 is an electrical schematic of the VFE 48. The VFE 48 enhances the efficiency of the tracking process, and contributes to the near real time capabilities of the AR system 10 by extracting the relevant information from the video signal through the bandwidth reduction circuit 84. The VFE 48 of the embodiment shown in the figures is a PCMCIA card. The signal from the sensor 26 is received by an I/O connector 86 on the VFE 48, and the extracted data from the VFE 48 is passed to the data bus of the computer 16 through the PCMCIA port 88. The bandwidth reduction circuit 84, or Feature Generator and Sync Separator, strips out the synchronization signals from the data signal, and detects the leading and trailing edges of fiducials. The VFE 48 reduces the bandwidth of the signal by accurately detecting the beginning and ending pixel of a fiducial during each video raster run. The line number, the beginning pixel number for a fiducial, and the number of continuous pixels after the beginning pixel are extracted from the signal for each fiducial detected in the scan line. This extracted information is called a "run" and is passed to the processor by the VFE 48.

The VFE 48 filters and removes video noise or garbage from the signal. An "initial correspondence" process calculates the bounds of expected runs, which reflect the known dimensions the individual fiducials and the estimated position of the sensor, beyond which no real fiducial would extend. The VFE 48 uses this bounds of expected runs to eliminate noise or garbage by rejecting runs that are either too large or too small to be a fiducial. Therefore, by filtering out noise and background, the VFE 48 efficiently reduces the amount of data processed by the computer to a manageable level. The data run is placed in a FIFO buffer 90 if it is not rejected as garbage or noise. The processor 18 retrieves the data run information from the buffer 90 as needed.

Referring again to FIGS. 1 and 9–14, the pattern of fiducials 12 includes a geometrically consistent hard fiducial pattern 32 and a pseudo random soft fiducial pattern 34. The hard fiducial pattern 32 is shown as a evenly spaced or geometrically consistent, rectilinear shape. However, the hard fiducial pattern 32 may be formed from other geometrically consistent polygons or shapes. The soft fiducial pattern 34 is formed from individual coordinate marks that have either a larger or smaller size than the coordinate marks formed in the hard fiducial pattern 52. In the wire harness fabrication AR system embodiment shown in the figures, each of the hard fiducials have a unique diameter of 0.6 inches, and the diameter of any of the soft fiducials may vary from 0.1 inch to 1.2 inches. At least one soft fiducial 34 is positioned within each polygon of hard fiducials 32. The location of the soft fiducials 34 is in one of n x n locations (for example, an 8×8 grid or 32×32 grid) within each polygon of hard fiducials 32 is determined by a pseudo random number generation process. The relative position of the soft fiducial 34 with respect to the polygon of hard fiducials uniquely identifies that polygon within the hard fiducial pattern 32.

The color of the pattern of fiducials 12 for the visual AR system 10 is contrasted to the color of the object surface. In the wire harness fabrication AR system embodiment, for example, the preferred color is determined by the spectral response of the sensor 26 (typically a CCD video camera), the wiring board color background desired by the operators, the color of any real wires or other objects in the field of view, and the light level and spectral content of the light at the wiring board 14. A black board or object surface 14 and white fiducials 12 provide sufficient contrast to enable the tracker to accurately identify the relative position and orientation between the wiring board 14 and the sensor 26. The pattern of fiducials 12 preferably comprises passive fiducials; i.e. the fiducials 12 do not send a signal nor do they embed position information. Rather, the position and orientation information is derived from the relationship between the geometrically consistent pattern of hard fiducials 32 and the pseudo random pattern of soft fiducials 34 as detected by the optical sensor 26.

Figure 19:
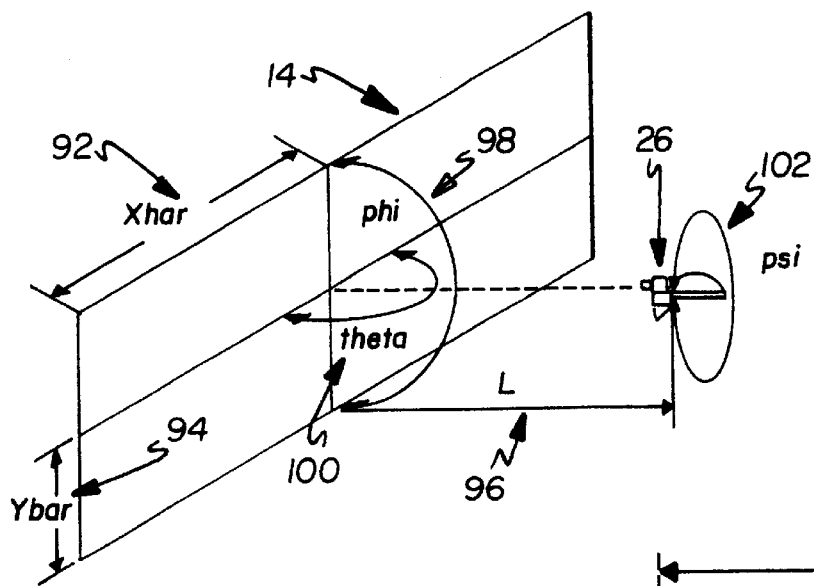
FIG. 19 illustrates the geometry represented by the six tracking parameters, including the orientation parameters (phi, theta and psi) and the position parameters (L, X-bar and Y-bar).
Figure 21:
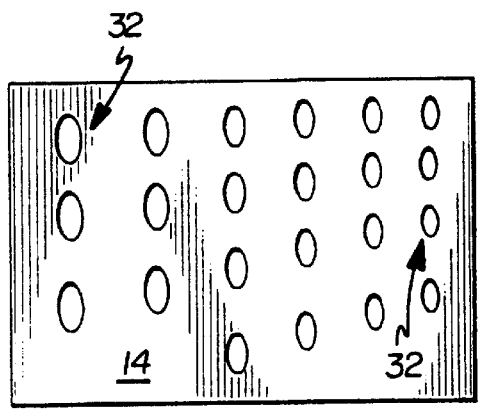
FIG. 21 illustrates a possible image of a pattern of fiducials captured by the head mounted display camera for a given set of orientation and position tracking parameters.

FIG. 19 illustrates the geometry represented by the six tracking parameters. The tracking parameters include three linear position parameters (X-bar 92, Y-bar 94, and L 96), and further include three angular orientation parameters (phi 98, theta 100, and psi 102). The X-bar 92 and Y-bar 94 parameters determine the position along the object surface 14 or wiring board, and L 96, phi 98, theta 100 and psi 102 determine the orientation of the sensor. FIG. 21 illustrates a possible image of a pattern of fiducials captured by the camera for a given orientation as determined by L 96, phi 98, theta 100 and psi 102. The size and shape of the fiducials are affected by the orientation of the sensor 26.

Figure 20:
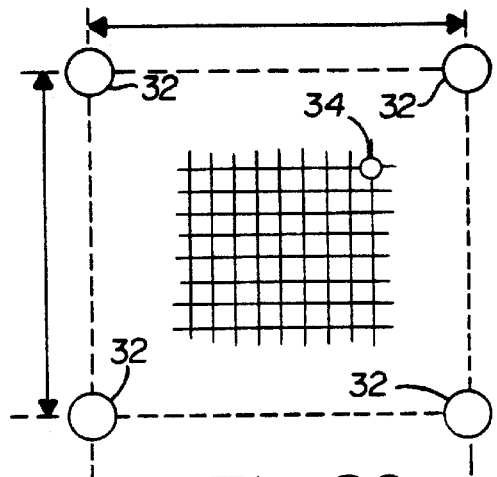
FIG. 20 illustrates the relationship between the hard fiducials and the floating or soft fiducials.
Figure 23:
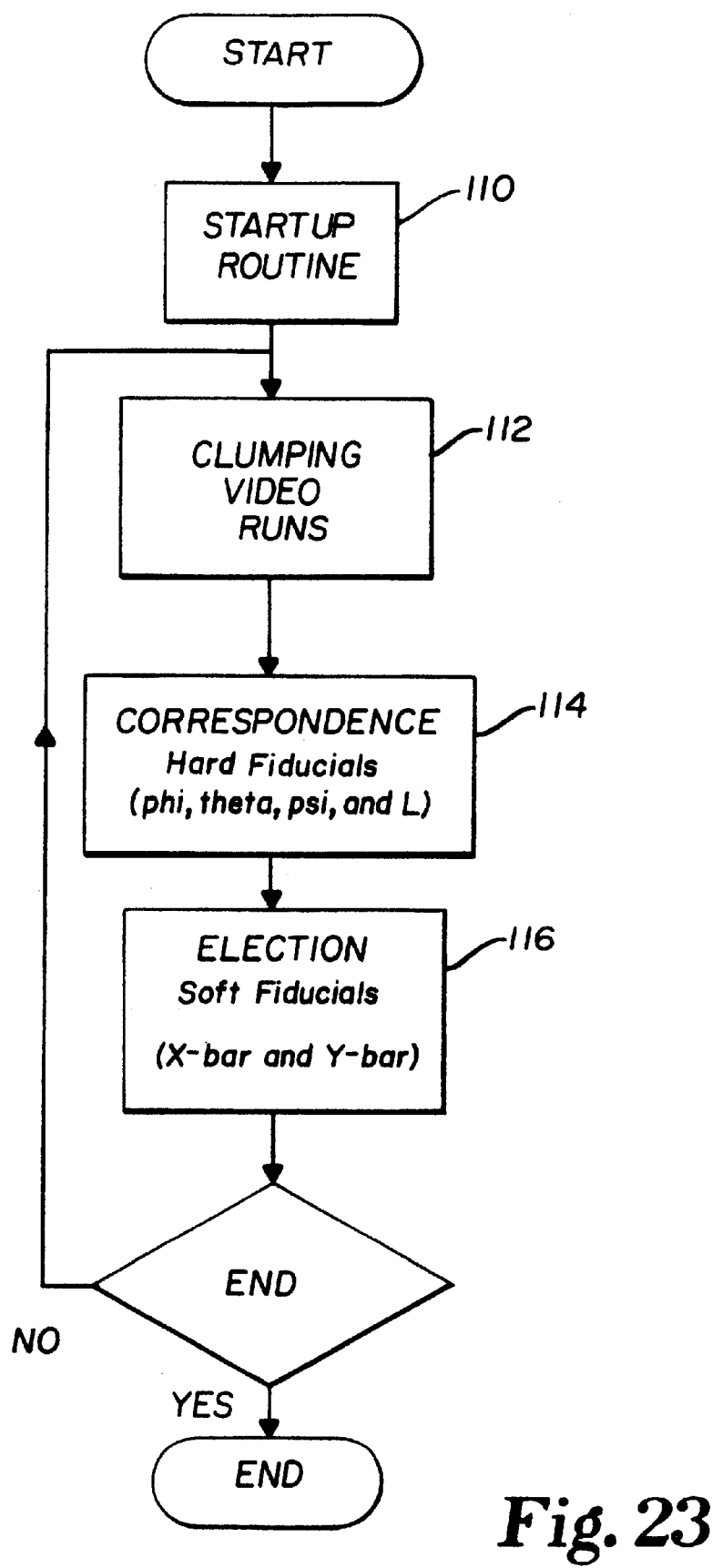
FIG. 23 is a flow chart of a method for tracking the position and orientation of an object of the present invention.

FIG. 23 illustrates a method for tracking the position and orientation of an object that is performed by the tracker application software 56 in the computer 52. An initial startup routine 110 loads the real world alignment data, such as a sensor-eye offset and factory alignments, from a database file in the memory 20 of the computer 16, compensates for known aberrations of the sensor 26, and sets a gain for the sensor 26. The processor 18 then performs a clumping routine, in which the processor 18 executes selected algorithms that "clump" the individual data runs together to form individual fiducial representations and then finds the centroid of those "clumps." The processor 18 then performs the correspondence process or routine 114, in which the processor 18 identifies or acquires the position of the "hard" fiducials using their known geometric relationship based on the reference pattern of fiducials stored in the memory 20 of the computer 16. In the embodiment shown in the figures, a polygon matching the known hard fiducial configuration is found by first matching three fiducials, then trying to match a fourth hard fiducial, and then searching for additional clumps in the data which correspond to adjacent polygons of hard fiducials. After recognizing the hard fiducial polygon(s) in the sensor field of view, the tracker estimates the sensor orientation (phi 98, theta 100 and psi 102) and distance L 96 from the object surface 14 through an acquire routine. The processor 18 then performs an election process or routine 116, in which the tracker then evaluates clumps of data which could represent individual soft fiducials in the object plane. The location of the soft fiducials within the detected polygon is stored and compared to the stored fiducial pattern data. Referring to FIG. 20, each hard fiducial polygon may be considered to have an imaginary grid. At least one soft fiducial will be centered on one of the intersections of the imaginary grid. The position of X-bar 92 and Y-bar 94 depends on the position of the soft fiducial(s) within the hard fiducial polygon. The algorithm evaluates these results and determines the X-bar 92 and Y-bar 94 parameters that determines the position of the sensor field of view on the object surface 14.

Figure 22:
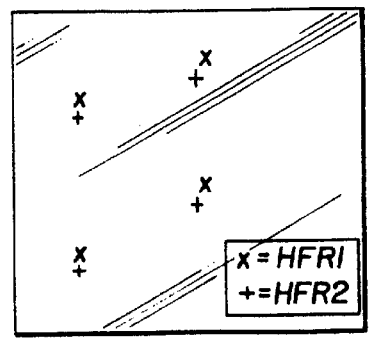
FIG. 22 illustrates the correspondence between four detected hard fiducials and four virtual fiducials predicted from previous tracking parameters.
Figure 24:
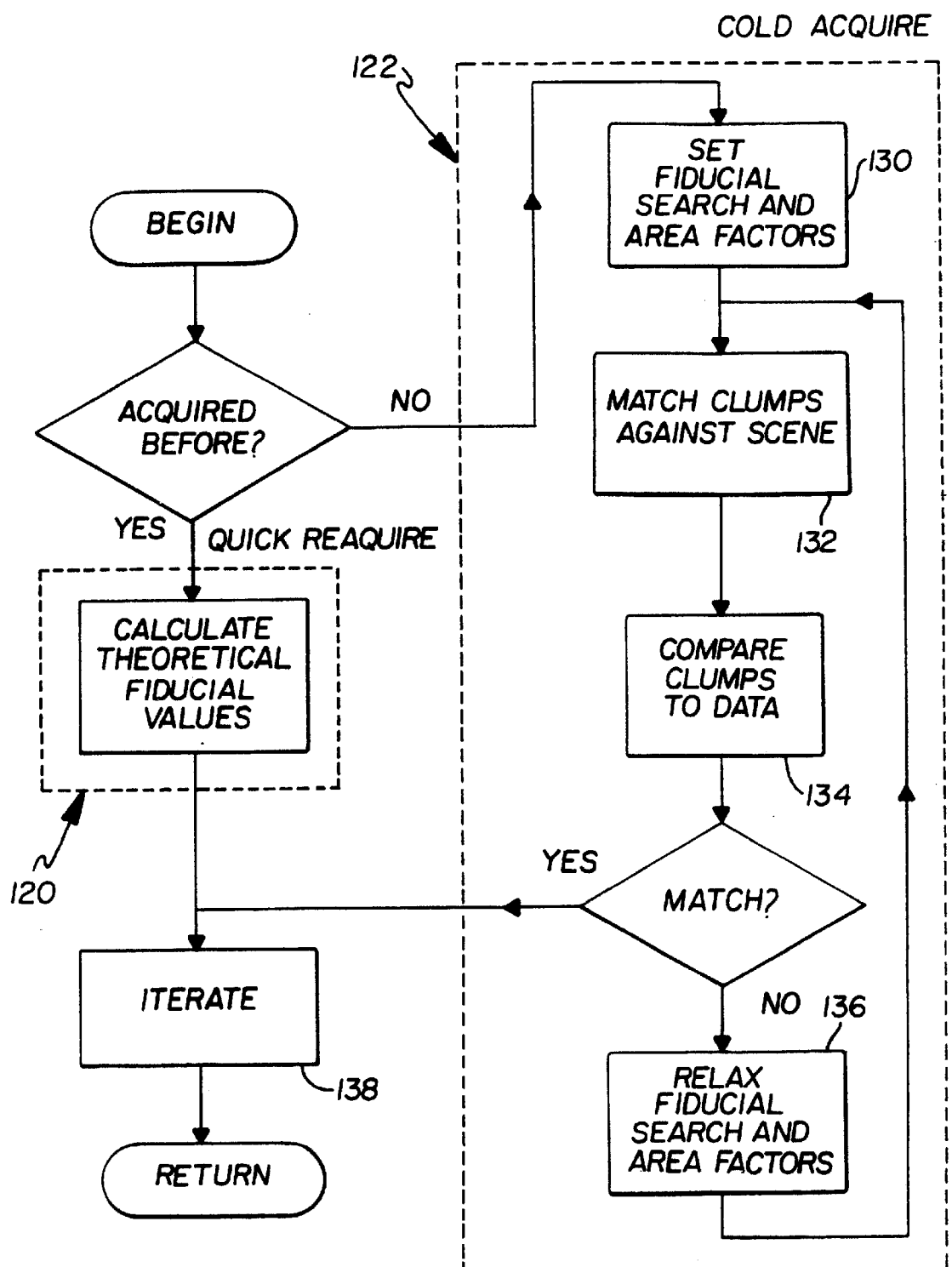
FIG. 24 is a flow chart of the acquire routine for the Correspondence and Election processes shown in FIG. 23.

FIG. 24 illustrates the method of acquiring hard or soft fiducial marks. First, the tracker determines whether the fiducials have been previously acquired. If the fiducials have been previously acquired, the tracker performs a quick acquire routine 120 in which it calculates the theoretical parameter values for the fiducials based on the previous position(s) of the fiducials. The sensor position is tracked with respect to the object surface by comparing and corresponding/electing clumps recorded in successive video fields. The movement of the sensor with respect to the object surface is tracked, and the movement data is used by the algorithm to predict immediate future locations of the fiducials within the sensor field of view. If the fiducials have not been previously acquired, the tracker performs a cold acquire routine 122 in which it sets factors or standards for the fiducial search 130, matches the clumps against the reference pattern or scene 132, and compares the results to determine if they fall within the standards for the fiducial search 134. If the results do not fall within the standards, the fiducial search and area factors are relaxed 136, and the tracker performs the matching 132 and comparing 134 processes again. After acquiring estimated values for the tracking parameters, the tracker performs an iteration process 138 until the detected pattern of fiducials match the reference pattern of fiducials to within a desired convergence. The iteration process is illustrated in FIG. 22 where a correspondence process is occurring between a calculated or reference pattern of fiducials and the detected pattern of fiducials. The iteration process "fine tunes" the calculation of the tracking parameters to accurately determine the relative position and orientation between the sensor and the object surface.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures.

What is claimed is:

1. A fiducial-based tracker system, comprising:
    (a) at least one optical sensor for detecting a pattern of fiducials disposed on an object surface, said pattern of fiducials including a hard fiducial pattern and a soft fiducial pattern, both of said hard fiducial and said soft fiducial patterns having a known shape and arrangement, said at least one optical sensor having a position and an orientation with respect to said pattern of fiducials on said object surface, said at least one optical sensor scanning said pattern of fiducials and detecting fiducial edges; and
    (b) a processor connected to said at least one optical sensor, said processor identifying said position and said orientation of said at least one optical sensor with respect to said object surface by matching a detected pattern of fiducials with a reference pattern of fiducials.

2. A fiducial-based tracker system for registering virtual information to real information within an augmented reality system, comprising:
    (a) at least one optical sensor for detecting a pattern of fiducials disposed on an object surface, said at least one sensor producing a signal corresponding to said detected pattern of fiducials, said pattern of fiducials including a hard fiducial pattern and a soft fiducial pattern, both of said hard fiducial and said soft fiducial patterns having a known shape and arrangement, said hard fiducial pattern being a geometrically consistent, rectilinear pattern, said soft fiducial pattern being a pseudo random pattern, wherein said orientation of said at least one sensor with respect to said pattern of fiducials is defined by angular parameters including phi, theta and psi, wherein said position of said at least one sensor with respect to said pattern of fiducials is defined by linear parameters including X-bar, Y-bar, and distance, said hard fiducial pattern being used to identify said phi, theta, psi and distance parameters and said soft fiducial pattern being used to identify said X-bar and Y-bar parameters, said at least one optical sensor having a position and an orientation with respect to said pattern of fiducials on said object surface, said at least one optical sensor scanning said pattern of fiducials and detecting fiducial edges;
    (b) a processor connected to said at least one optical sensor, said processor identifying said position and said orientation of said at least one optical sensor with respect to said object surface by matching a detected pattern of fiducials with a reference pattern of fiducials; and (c) a video feature extractor for reducing bandwidth to quickly process said signal and for removing noise from said signal.

3. An augmented reality system incorporating a fiducial-based tracking system for registering virtual information to real information, comprising:

(a) a pattern of fiducials disposed on an object surface, said pattern of fiducials including a geometrically consistent hard fiducial pattern and a pseudo-random soft fiducial pattern, (b) a computer having a processor and a memory;

(c) a user interface for receiving input and presenting augmented information to a user, said user interface including a head mounted display on which said computer presents said augmented information, said head mounted display presenting said augmented information at an update rate of at least 60 Hertz and a latency below 16 milliseconds; and (d) a tracker for detecting said pattern of fiducials, said tracker including at least one optical sensor for detecting said pattern of fiducials disposed on said object surface, said at least one optical sensor being electrically connected to said computer, said pattern of fiducials including a hard fiducial pattern and a soft fiducial pattern, both of said hard fiducial and said soft fiducial patterns having a known shape and arrangement, said at least one optical sensor having a position and an orientation with respect to said pattern of fiducials on said object surface, said at least one optical sensor scanning said pattern of fiducials and detecting fiducial edges, said processor being connected to said at least one optical sensor and identifying said position and said orientation of said at least one optical sensor with respect to said object surface by matching a detected pattern of fiducials with a reference pattern of fiducials stored in said memory of said computer.

4. A method for tracking the position and orientation of an object of claim 1, comprising the step of (a) scanning across an object to detect fiducials and form runs;

(b) clumping video runs to detect a pattern of fiducials; wherein the step of clumping video runs includes the steps of:
    (i) combining adjacent video runs; and
    (ii) extracting relevant information about the runs;

(c) acquiring estimated values for a set of tracking parameters by comparing a detected pattern of fiducials to a reference pattern of fiducials, wherein the detected and reference patterns of fiducials includes a geometrically consistent pattern of hard fiducials and a pseudo random pattern of soft fiducials, wherein the step of acquiring estimated values for a set of tracking parameters includes the steps of:
    (i) corresponding a predetermined number of detected hard fiducials with the reference pattern of fiducials to estimate phi, theta and psi orientation parameters and to estimate a distance position parameter; and
    (ii) electing at least one of the soft fiducials with the reference pattern of fiducials to estimate x-bar and y-bar position parameters; and (d) iterating the estimated values for the set of tracking parameters until the detected pattern of fiducials match the reference pattern of fiducials to within a desired convergence.

5. A method for augmenting visual reality, comprising the steps of:

(a) disposing a pattern of fiducials on an object surface, wherein the pattern of fiducials are disposed on the object surface in a geometrically consistent hard fiducial pattern and in a pseudo random soft fiducial pattern;

(b) tracking the position and orientation of the object, including:
    (i) scanning across the object to detect the fiducials, wherein a video run is formed by a scan;
    (ii) clumping video runs to detect the pattern of fiducials;
    (iii) acquiring estimated values for a set of tracking parameters by comparing a detected pattern of fiducials to a reference pattern of fiducials; and
    (iv) iterating the estimated values for the set of tracking parameters until the detected pattern of fiducials match the reference pattern of fiducials to within a desired convergence;

(c) processing virtual information stored in a computer memory according to the position and orientation of the object; and (d) presenting the virtual information with real information to a user in near real time, wherein said steps of tracking the position and orientation of the object, retrieving virtual information, and presenting the virtual information with real information are performed with an update rate of at least 60 Hertz and a latency below 16 milliseconds.

6. A method according to claim 5, wherein steps (a) through (c) are performed with a self-contained, mobile system that comprises a wearable computer.

7. A method according to claim 5, wherein step (a) is performed with a self-contained, mobile system that comprises a head mounted display.

8. A method according to claim 5, wherein step (c) comprises presenting virtual aural information to the user.

9. A method according to claim 5, wherein step (c) comprises presenting virtual kinesthetic information to the user.

10. A method according to claim 5, wherein at least one of steps (b) and (c) are performed by electronically reducing said virtual information to a reduced amount of information for manageable processing.

11. A method according to claim 10, wherein said step of electronically reducing said virtual information comprises electronically filtering said information to eliminate background information.

12. A method according to claim 10, wherein said step of electronically reducing said virtual information comprises electronically filtering said information to eliminate noise.

13. A method according to claim 12, wherein said step of electronically filtering said information to eliminate noise comprises electronically correcting to compensate for known aberrations of at least one hardware element.

14. A method according to claim 10, wherein said step of electronically reducing said virtual information comprises removing at least one synchronization signal from said information.

15. A method according to claim 10, wherein said step of electronically reducing said virtual information comprises a step of determining a centroid position of at least one of said fiducials.

16. A method according to claim 15, wherein said step of electronically reducing said virtual information further comprises utilizing said centroid position in subsequent electronic processing.

17. A method according to claim 15, wherein said step of determining a centroid position of at least one of said fiducials comprises steps of determining at least two boundary locations of a fiducial and calculating the centroid position based at least in part on said boundary locations.

18. A method according to claim 17, wherein said step of determining a centroid position of at least one of said fiducials comprises detecting a beginning pixel and an ending pixel of the fiducial during a video raster run; extracting the line number, the beginning pixel number and the number of continuous pixels after the beginning pixel; processing such information obtained from different line numbers of the video raster run to form individual fiducial representations; and further processing this information to determine the centroid position.

19. A method according to claim 5, wherein step (a) comprises tracking the position and orientation of at least one hard fiducial pattern having a known geometric shape and further comprises tracking the position and orientation of at least one soft fiducial pattern.

20. A method according to claim 19, wherein at least one fiducial of said soft fiducial pattern is located within said known geometric shape.

21. A method according to claim 19, wherein step (b) comprises a step of locating said hard fiducial pattern, and wherein said step of locating said hard fiducial pattern is aided by utilizing a reference pattern of fiducials corresponding to said known geometric shape.

22. A method according to claim 19, wherein step (b) further comprises locating said soft fiducial pattern, and wherein said step of locating said soft fiducial pattern is aided by said prior determination of said hard fiducial pattern.

23. A method according to claim 19, wherein step (b) comprises electronically calculating the position and orientation of the object based on the determined location of the hard fiducial pattern and the determined location of the soft fiducial pattern.

24. A method according to claim 23, wherein said step of electronically calculating the position and orientation of the object is performed based on a relative position of at least one fiducial within said soft fiducial pattern that is located within said known geometric shape of said hard fiducial pattern.

25. A method according to claim 5, wherein step (a) comprises iteratively tracking the position and orientation of a number of fiducials on said object.

26. A method according to claim 25, wherein said step of iteratively tracking the position and orientation of a number of fiducials comprises a quick acquire routine for calculating a theoretical parameter value for at least one fiducial based on a previous position of the fiducial.

27. A method according to claim 26, wherein said quick acquire routine tracks movement of the system with respect to the object and utilizes data pertaining to said movement to predict likely future locations of said fiducial.

28. A method according to claim 25, wherein step (b) comprises receiving a signal of information based on said iterative tracking and processing said signal to eliminate nonessential data, thereby minimizing bandwidth requirements.

* * * * *